(12) United States Patent
Ding

(10) Patent No.: US 11,513,040 B2
(45) Date of Patent: Nov. 29, 2022

(54) SAMPLE STAINING DEVICE

(71) Applicant: AVE SCIENCE & TECHNOLOGY CO., LTD., Changsha (CN)

(72) Inventor: Jianwen Ding, Changsha (CN)

(73) Assignee: AVE SCIENCE & TECHNOLOGY CO., LTD., Changsha (CN)

( * ) Notice: Subject to any disclaimer, the term of this patent is extended or adjusted under 35 U.S.C. 154(b) by 188 days.

(21) Appl. No.: 16/483,885

(22) PCT Filed: Jun. 22, 2017

(86) PCT No.: PCT/CN2017/089497
§ 371 (c)(1),
(2) Date: Aug. 6, 2019

(87) PCT Pub. No.: WO2018/145386
PCT Pub. Date: Aug. 16, 2018

(65) Prior Publication Data
US 2020/0025654 A1   Jan. 23, 2020

(30) Foreign Application Priority Data

Feb. 8, 2017   (CN) .......................... 201710068920.0

(51) Int. Cl.
*B01L 9/00*   (2006.01)
*G01N 1/31*   (2006.01)
(Continued)

(52) U.S. Cl.
CPC ................ *G01N 1/312* (2013.01); *B01L 9/52* (2013.01); *G01N 1/44* (2013.01); *B01L 2300/0822* (2013.01); *G01N 2035/00346* (2013.01)

(58) Field of Classification Search
CPC ..................... G01N 1/312; G01N 1/44; G01N 2035/00138; G01N 2035/00346;
(Continued)

(56) References Cited

U.S. PATENT DOCUMENTS 3,667,896 A * 6/1972 McCormick ........... G02B 21/34
427/4
5,068,091 A   11/1991 Toya
(Continued)

FOREIGN PATENT DOCUMENTS

CN   2148957 Y   12/1993
CN   102220236 A   10/2011
(Continued)

OTHER PUBLICATIONS

International Search Report and Written Opinion from International Application No. PCT/CN2017/089497 dated Nov. 4, 2017.
(Continued)

*Primary Examiner* — Samuel P Siefke
*Assistant Examiner* — Tingchen Shi
(74) *Attorney, Agent, or Firm* — Dorsey & Whitney LLP

(57) ABSTRACT

A sample staining device, comprising a staining platform provided with a staining solution and cleaning solution supply part; glass slide support structures located on either side of the staining platform and forming a certain clearance between a glass slide and the staining platform; and a glass slide driving mechanism that enables the glass slide to move while maintaining a certain clearance from the staining platform. When said device works, a staining solution is supplied to the staining platform, and a convex liquid surface is formed due to surface tension; when the glass slide moves to the convex liquid surface of the staining solution, the staining solution infiltrates and diffuses in the clearance formed between the staining platform and the glass slide to
(Continued)

cover the glass slide so as to stain a sample; and after the glass slide is stained, a cleaning solution is supplied to clean the residual staining solution.

9 Claims, 4 Drawing Sheets

(51) Int. Cl.
*G01N 1/44* (2006.01)
*G01N 35/00* (2006.01)

(58) Field of Classification Search
CPC ............ G01N 35/00029; B01L 9/52; B01L 2300/0822; B01L 9/56
See application file for complete search history.

(56) References Cited

U.S. PATENT DOCUMENTS

| 8,932,543 | B2 * | 1/2015 | Bui | ............... | B01L 3/502715 |
| | | | | | 422/509 |
| 2008/0102006 | A1 * | 5/2008 | Kram | ................ | G01N 1/312 |
| | | | | | 422/300 |
| 2010/0028978 | A1 * | 2/2010 | Angros | ............ | B01L 3/0293 |
| | | | | | 435/283.1 |
| 2010/0238356 | A1 | 9/2010 | Kida et al. | | |

FOREIGN PATENT DOCUMENTS

| CN | 102854050 | A | 1/2013 | | |
| CN | 106706398 | A | 5/2017 | | |
| CN | 206546284 | U | 10/2017 | | |
| JP | H01155269 | A | 6/1989 | | |
| JP | 2001296219 | A | 10/2001 | | |
| RU | 2125726 | C1 | 1/1999 | | |
| RU | 2386137 | C1 | 4/2010 | | |
| SU | 1447847 | A1 | 12/1988 | | |
| WO | 2009085842 | A1 | 7/2009 | | |
| WO | WO-2009085842 | A1 * | 7/2009 | ............. | G01N 1/312 |
| WO | WO-2011060387 | A1 * | 5/2011 | ............. | G01N 1/312 |

OTHER PUBLICATIONS

1st Office Action for Japanese Application No. 2019-563656 dated Jun. 30, 2020.
Extended European Search Report for International Application No. PCT/CN2017/089497 dated Jan. 27, 2020.
Office Action and Search Report for Russian Application No. 2019126569 dated Apr. 14, 2020.

* cited by examiner

SAMPLE STAINING DEVICE

This application claims priority to Chinese Patent Application No. 201710068920.0, entitled "Sample Staining Device", filed on Feb. 8, 2017, the entire contents of which is expressly incorporated herein by reference in its entirety.

TECHNICAL FIELD

The present disclosure relates to the field of medical examination technologies, and more particularly to a sample staining device.

BACKGROUND

In the field of medical examination, staining is an experimental method in which tissues and intracellular structures of a sample to be tested are stained with different color(s) by means of one or more dyes, so that the intracellular structures can be clearly observed under a microscope, in order to make a correct judgment for clinical diagnosis.

Conventional sample staining may be classified into manual staining and automatic staining. The automatic staining is accomplished via an automatic staining device. The conventional automatic staining device mainly includes two types of mainstream structures, one of which stains each smear by using a plurality of staining cassettes, resulting in a low working efficiency and a difficulty to meet demands of large quantities of work. The other type of the staining devices simultaneously stain a plurality of smears by using a staining tray, while they have precise and complex structures. The staining device using the staining cassette needs to be provided with various transporting and holding mechanisms to transport the stain cassette and hold the smears, resulting in a complex structure and a high cost. The staining device using the staining tray needs to be provided with a moving mechanism for the stain tray to move the smears to enter and exit the staining tray, resulting in a complex structure and a high cost.

And the manual staining is not suitable for examination of large quantities of samples as it requires a high level of skills for an operator and has a low staining efficiency.

As such, an urgent problem to be solved by those skilled in the art at present is how to effectively solve the technical problem that it is difficult to take into account both the operation efficiency and the equipment cost in the implementation of sample staining.

SUMMARY

Accordingly, an object of the present disclosure is to provide a sample staining device having a designed structure that is able to effectively solve the technical problem that it is difficult to achieve both the operation efficiency and the equipment cost in the implementation of sample staining.

In order to achieve the aforementioned object, the present disclosure provides the following technical solutions.

A sample staining device is provided, including a staining platform configured to supply a staining liquid and a cleaning liquid, respectively; and a protruding supporting structure located on both sides of the staining platform to form a gap between a slide and a surface of the staining platform for diffusion and infiltration of liquid between the slide and the surface of the staining platform. The device further includes a slide driving mechanism configured to maintain a clearance movement of the slide with respect to the staining platform.

Preferably, in the aforementioned sample staining device, the staining platform has a staining area and a cleaning area along a passing direction of the slide, and the staining area and the cleaning area are provided with independent working liquid output structures, respectively.

Preferably, in the aforementioned sample staining device, each of the working liquid output structures includes a liquid outlet located on the surface of the staining platform and configured to supply a working liquid to the staining platform.

Preferably, in the aforementioned sample staining device, each of the working liquid output structures includes a liquid supplying groove located on the surface of the staining platform and provided with a liquid outlet.

Preferably, both ends of the liquid supplying groove extend to both edges of the staining platform.

Preferably, in the aforementioned sample staining device, a working liquid supplement groove in communication with the liquid outlet is provided in front of the liquid supplying groove along the passing direction of the slide, the working liquid supplement groove located in the staining area is configured to output a staining liquid to the staining area, and the working liquid supplement groove located in the cleaning area is configured to output a cleaning liquid to the cleaning area to wash a residual staining liquid.

Preferably, in the aforementioned sample staining device, the staining platform is provided with an overflow groove on a periphery thereof, and the overflow groove is configured to discharge an excessive amount of the staining liquid or the cleaning liquid.

Preferably, in the aforementioned sample staining device, the overflow groove is disposed parallel to a length direction of the staining platform.

Preferably, in the aforementioned sample staining device, the sample staining device further includes a main control module configured to control an operation of the slide driving mechanism and an output of the staining liquid and the cleaning liquid.

Preferably, in the aforementioned sample staining device, the sample staining device further includes a detector configured to detect whether the slide reaches a corresponding working area, and the detector is communicatively coupled to the main control module.

Preferably, in the aforementioned sample staining device, the staining platform is provided with a heating assembly in a predetermined area thereon, and the heating assembly is configured to heat the slide or a working liquid.

Preferably, in the aforementioned sample staining device, the slide driving mechanism is threaded spindle mechanism.

The sample staining device according to the present disclosure includes a staining platform configured to supply a staining liquid and a cleaning liquid. A protruding supporting structure is provided and located on both sides of the staining platform, such that a gap is formed between the slide and the surface of the staining platform for diffusion and infiltration of liquid between the slide and the surface of the staining platform. The sample staining device further includes a slide driving mechanism configured to maintain a clearance movement of the slide with respect to the staining platform. The sample staining device according to the present disclosure performs staining of a sample slide on the surface of the staining platform. The staining liquid forms a liquid film on the surface of the staining platform under a principle of surface tension, and the liquid has a level exceeding a lower surface of the slide. Under an action of the supporting structure, the gap formed between the surface of the slide and the surface of the platform enables the staining working liquid to diffuse sufficiently to the entire sample area on the slide. In addition, when the slide is driven by the slide driving mechanism to translate through the staining platform, the liquid film formed by the staining liquid can sufficiently infiltrate the slide, so that staining is sufficiently performed on the slide corresponding to the entire staining platform via the staining liquid. The sample staining device has a simple design in structure, and is able to simultaneously drive one or more slides carrying samples to pass through the staining platform in sequence by means of a simple slide driving mechanism capable of linear conveyance, so as to achieve staining of the samples. In this way, it is possible to efficiently complete staining of large quantities of samples, and thus effectively solve the technical problem in the medical examination technologies that it is difficult to take into account both the operation efficiency and the equipment cost in the implementation of sample staining.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and those skilled in the art can derive other drawings from the accompanying drawings without creative efforts.

Figure 1:
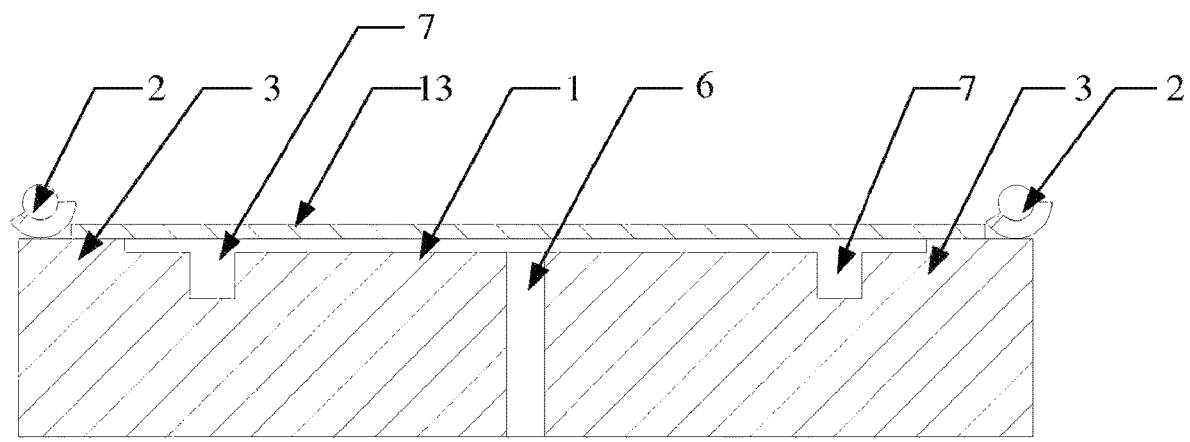
FIG. 1 is a schematic cross-sectional view of a sample staining device according to an embodiment of the present disclosure, taken along a liquid supplying groove.

The reference numbers in the drawings are referred to the following:
staining platform 1, slide driving mechanism 2, supporting structure 3, liquid supplying groove 5, liquid outlet 6, overflow groove 7, working liquid supplement groove 8, detector 10, staining area 11, cleaning area 12, slide 13, fixing area 14.

DETAILED DESCRIPTION OF THE EMBODIMENTS

Embodiments of the present disclosure disclose a sample staining device for solving the technical problem in the medical examination technologies that it is difficult to take into account both the operation efficiency and the equipment cost in the implementation of sample staining.

The technical solutions in the embodiments of the present disclosure will be clearly and completely described below in combination with the accompanying drawings in the embodiments of the present disclosure. It may be evident that the described embodiments are merely a part of the embodiments of the present disclosure, not all of the embodiments. Other embodiments based on the embodiments of the present disclosure obtained by those skilled in the art without creative efforts shall fall within the scope of the present disclosure.

Figure 2:
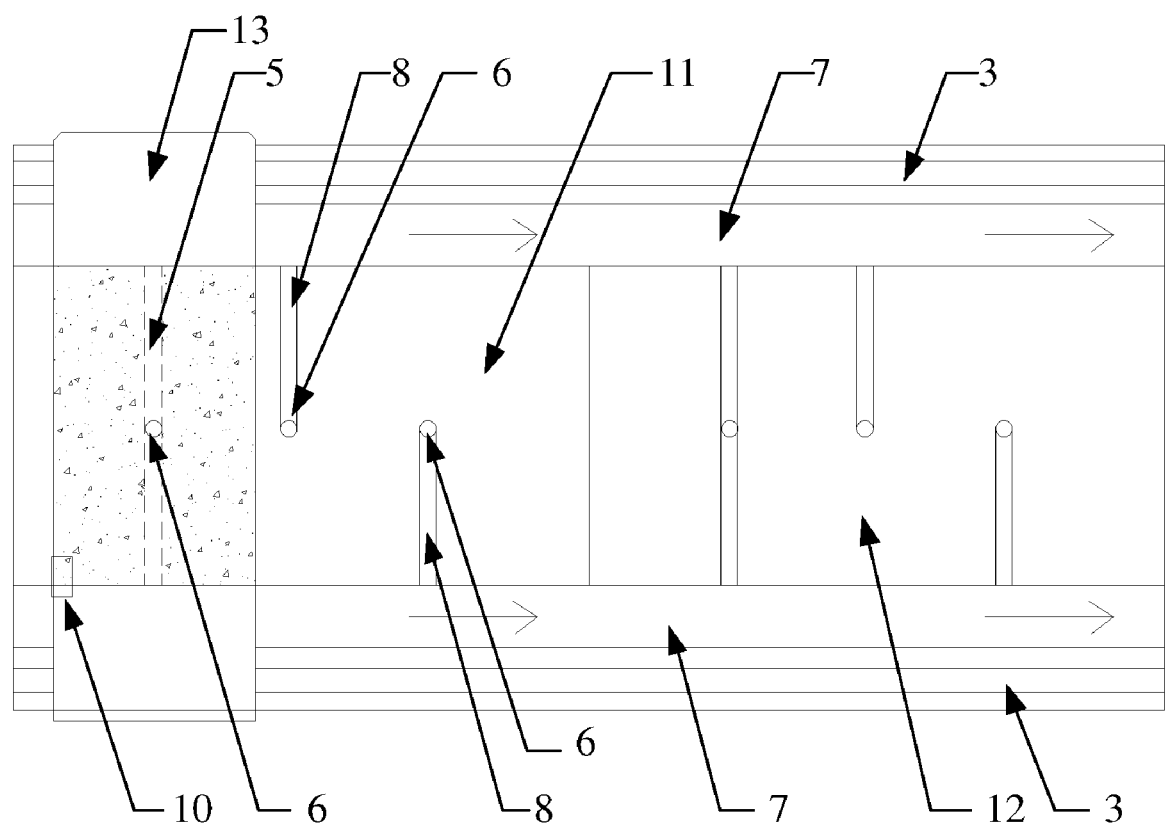
FIG. 2 is a schematic top plan view of a sample staining device according to an embodiment of the present disclosure.

Referring to FIG. 1 and FIG. 2, FIG. 1 is a schematic cross-sectional view of a sample staining device according to an embodiment of the present disclosure, taken along a liquid supplying groove, and FIG. 2 is a schematic top plan view of a sample staining device according to an embodiment of the present disclosure.

The sample staining device provided by the embodiment of the present disclosure includes a staining platform 1 configured to supply a staining liquid and a cleaning liquid, respectively. A protruding supporting structure 3 is provided and located on both sides of the staining platform 1, such that a gap is formed between a slide 13 and a surface of the staining platform 1 for diffusion and infiltration of liquid between the slide 13 and the surface of the staining platform 1. The sample staining device further includes a slide driving mechanism 2 configured to maintain a clearance movement of the slide 13 with respect to the staining platform 1.

It should be noted that the slide driving mechanism can be a conveying belt or a more precise threaded spindle mechanism as long as it ensures that the slide can be driven to move linearly on the surface of the staining platform along a length direction of the staining platform. Due to the gravity action and the structure of the staining platform itself, the slide can be firmly placed on the staining platform during conveyance and staining without an additional complex holding or fixing mechanism. The slide placed on the staining platform is driven to move by the slide driving mechanism, and a speed and a distance of the movement are adjusted according to a staining period. During simultaneous staining of multiple samples in a line, it is difficult to realize synchronization of various staining steps for multiple samples as periods for various staining steps are different. According to the present disclosure, different staining periods in different areas can be achieved by a variable speed driving mechanism or a multi-stage driving mechanism. In addition, the supply of the staining liquid or the cleaning liquid mentioned herein refers to a supply of a liquid in a specific area of the staining platform by a specific mechanism, such as a staining liquid for staining of the sample, or a chemical liquid for pretreatment of the sample, or a cleaning liquid for cleaning of the stained sample, or the like.

The sample staining device according to the present embodiment performs staining of the sample slide on the surface of the staining platform. The staining liquid forms a liquid film on the surface of the staining platform under the principle of surface tension, and the liquid has a level exceeding a lower surface of the slide. Under an action of the supporting structures, the gap formed between the surface of the slide and the surface of the platform enables the staining working liquid to diffuse sufficiently to the entire sample area on the slide. In addition, when the slide is driven by the slide driving mechanism to translate through the staining platform, the liquid film formed by the staining liquid can sufficiently infiltrate the slide, so that staining is sufficiently performed on the slide corresponding to the entire staining platform via the staining liquid. The sample staining device has a simple design in structure, and is able to simultaneously drive one or more slides carrying samples to pass through the staining platform in sequence by means of a simple slide driving mechanism capable of linear conveyance, so as to achieve staining of the samples. In this way, It is possible to efficiently complete staining of large quantities of samples, and thus effectively solve the technical problem in the medical examination technologies that it is difficult to take into account both the operation efficiency and the equipment cost in the implementation of sample staining.

On the basis of the present embodiment, a technical solution is further provided in which the protruding supporting structure itself can drive the translational movement of the slide on the staining platform. For example, the supporting structure itself is a conveying belt or the like disposed on both sides of the edge of the staining platform.

In order to further optimize the aforementioned technical solution, it is preferred on the basis of the aforementioned embodiment that in the aforementioned sample staining device, the staining platform 1 includes a staining area 11 and a cleaning area 12 respectively provided along a passing direction of the slide 13. The staining area 11 and the cleaning area 12 are provided with independent working liquid output structures, respectively.

In the technical solution according to the present embodiment, separation between the staining area and the cleaning area may be made by additionally providing a separating structure on the staining platform. The separating structure may be a frame structure protruding from the staining platform to prevent the staining or cleaning liquid in one area from diffusing to the other area. Alternatively, it is possible to separate the staining area and the cleaning area via a spatial distance of the staining platform itself without the additional separating structure, so that various staining functions in different areas can be achieved.

It is possible to arrange the staining area and the cleaning area in various manners according to different specific working requirements. In a primary design, one staining area and one cleaning area arranged behind the staining area are provided. In addition, a plurality of staining areas having the same function can be provided side by side along the passing direction of the slide to enhance staining effect, and one or more cleaning areas are arranged at the end. It should be appreciated that the aforementioned technical solution may also include a plurality of various staining areas, each of which supplies a different kind of staining liquid, so as to deal with an experiment requiring one sample to have various stained areas, such that staining of a plurality of various stained areas can be accomplished at one time. On this basis, in order to meet requirements of some specific observation experiments, for example, when different kinds of staining liquids may influence the coloring effect with each other, a plurality of staining areas and cleaning areas can be arranged at intervals. Cleaning is performed after staining of a specific observation area is completed, and staining of the other observation areas would be performed subsequently.

In order to further optimize the aforementioned technical solution, it is preferred on the basis of the aforementioned embodiment that in the aforementioned sample staining device, each of the working liquid output structures includes a liquid outlet 6 provided on the corresponding area of the surface of the staining platform 1 and configured to supply a working liquid to the staining platform 1.

The liquid outlet 6 provided in the corresponding area of the surface of the staining platform 1 are referred to a liquid outlet of the cleaning area which outputs the cleaning liquid, or a liquid outlet of the staining area which outputs the staining liquid. By providing such liquid outlet for outputting the liquid, the liquid outlet is in communication with the working liquid output structure for supplying the liquid. It is possible to provide pips hidden in a bottom of the platform for outputting the liquid. Specifically, the liquid output structure may be a liquid supplying pump in communication with the pipes and a liquid storage structure, and actively supplies the liquid via the pump. Alternatively, in order to save costs and simplify structures, the liquid output structure may also be a liquid supplying connector configured to supply the liquid supplying groove with the liquid that can reach a predetermined level.

Figure 4:
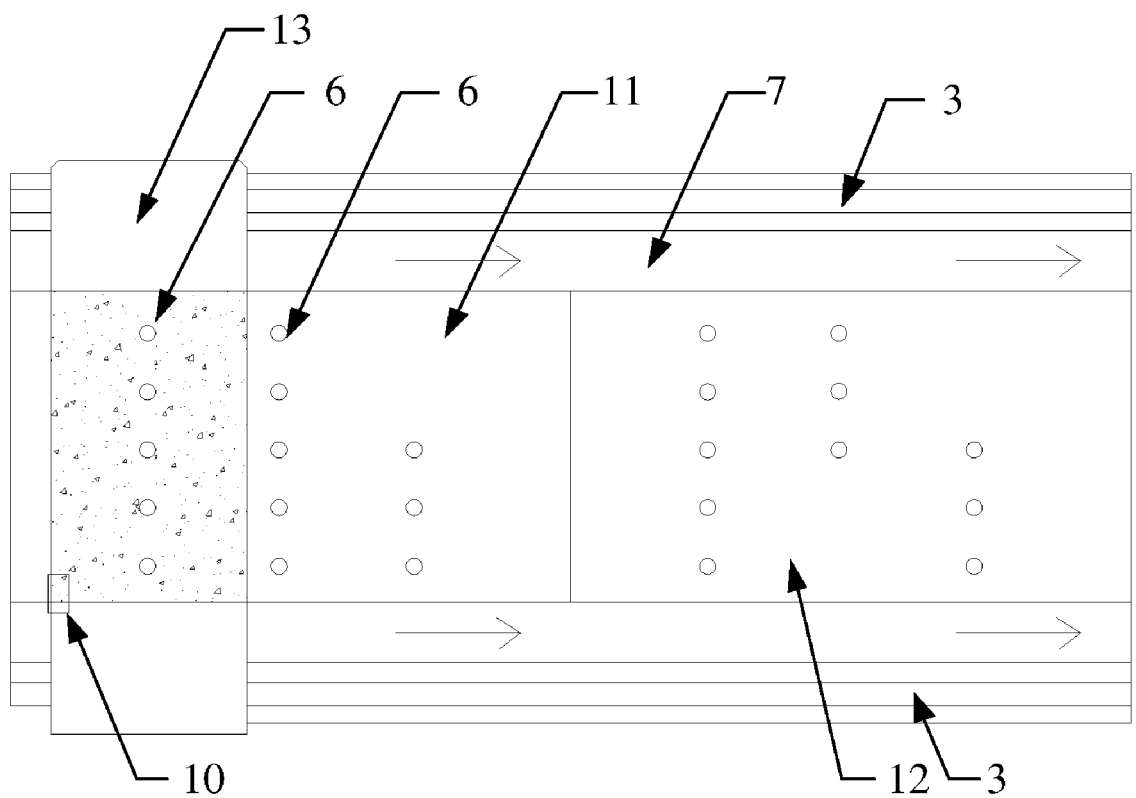
FIG. 4 is a schematic a top plan view of a sample staining device according to a third embodiment of the present disclosure.

Referring to FIG. 4, FIG. 4 is a schematic top plan view of a sample staining device according to a third embodiment of the present disclosure.

In addition, in order to ensure that the working liquid outputted to the staining platform through the liquid outlets has a large coverage and a good diffusion effect, a plurality of liquid outlets may be further provided in one area. Specifically in the present embodiment, a row of liquid outlets may be provided in each area in order to achieve a larger liquid coverage area.

In order to further optimize the aforementioned technical solution, it is preferred on the basis of the aforementioned embodiment that in the aforementioned sample staining device, each of the working liquid output structures further includes a liquid supplying groove 5 located on the surface of the staining platform 1, and the liquid outlet 6 is disposed within the liquid supplying groove 5.

In the technical solution according to the present embodiment, the working liquid output structure includes such a structure as the liquid supplying groove which is an elongated groove. Since both ends of the slide are supported by the supporting structure and a middle area of the slide is stained in the staining platform during staining of the slide, the design of the liquid supplying groove can cover the width of a larger desired stained area on the slide, which is more favorable to diffusion of the liquid compared with a hole design.

In addition, it should be noted that the liquid supplying groove supplies a different kind of the liquid, such as a staining liquid, a cleaning liquid, or a mordanting liquid, according to a difference between the functional areas on the staining platform. Mordanting refers to treating a certain object with chemicals, thereby provide the object with an ability to combine with the staining liquid. It is possible to supply the mordanting liquid before or after staining to achieve a better staining effect.

In order to further optimize the aforementioned technical solution, it is preferred on the basis of the aforementioned embodiment that in the aforementioned sample staining device, both ends of the liquid supplying groove 5 extends to the edges of the supporting structure 3 located on both sides of the staining platform 1, and the liquid outlet 6 is provided at the midpoint in the length direction of the liquid supplying groove 5.

In the technical solution according to the present embodiment, since both ends of the slide are supported by the supporting structure and a middle area of the slide is stained in the staining platform during staining of the slide, the design that both ends of the liquid supplying groove extending to the edges of the supporting structure covers the width of the whole desired stained areas on the slide. An extending direction of the liquid supplying groove may be perpendicular to the edges of the supporting structure. Alternatively, the extending direction of the liquid supplying groove may be arranged in a certain inclined angle to increase the area of the slide covered by the liquid supplying groove 5. Alternatively, in order to achieve a larger coverage area, the linear liquid supplying groove may be provided with a branch structure to optimize diffusion of the liquid on the slide. The liquid outlet is arranged at the midpoint in the length direction of the liquid supplying groove to optimize the diffusion effect, so as to ensure a better consistency of the staining effect of the sample on the slide in all directions. In addition, the midpoint here is not the midpoint in a strict sense, but within a certain area near the midpoint.

In order to further optimize the aforementioned technical solution, it is preferred on the basis of the aforementioned embodiment that in the aforementioned sample staining device, a working liquid supplement groove 8 in communication with the liquid outlet is provided in front of the liquid supplying groove 5 along the passing direction of the slide 13. The working liquid supplement groove 8 located in the staining area 11 is configured to output the staining liquid to the staining area 11, and the working liquid supplement groove 8 located in the cleaning area 12 is configured to output the cleaning liquid to the cleaning area 12 to wash a residual staining liquid.

In the technical solution according to the present embodiment, the working liquid supplement groove is provided in front of the liquid supplying groove to supplement the working liquid such as the staining liquid or the cleaning liquid. On the basis that the liquid supplying groove is provided, the working liquid supplement groove is additionally provided to supplement the working liquid. Since it may be difficult for the working liquid such as the staining liquid supplied at a single time to meet the practical demand, providing the supplement groove can increase an amount of the outputted working liquid, and allow the sample on the slide to be stained or cleaned in a working liquid environment for a longer continuous period.

It is preferred that one end of the working liquid supplement groove extends to the vicinity of a center line of the staining platform, i.e. the position where the liquid outlet of the liquid supplying groove in the aforementioned embodiment is located, and one other end of the working liquid supplement groove extends to the edge of the supporting structure. The function of the working liquid supplement groove is mainly to supplement the liquid to the slide corresponding to a half area where the working liquid supplement groove is provided, so as to prevent insufficient supply of the working liquid to the entire stained area of the slide and avoid imperfect supplement effect. The working liquid supplement groove is also provided with a liquid outlet which is located at an inner end of the working liquid supplement groove, i.e. in the vicinity of the center line of the staining platform. In view of the surface tension of the liquid, setting the liquid outlet structure in the middle can achieve faster diffusion of the liquid toward the periphery to the edge, whereas if the liquid outlet is located at the edge, the period required for the liquid to reach the middle will be longer.

In order to further optimize the aforementioned technical solution, it is preferred on the basis of the aforementioned embodiment that in the aforementioned sample staining device, the staining platform 1 is provided with an overflow grooves 7 on a periphery thereof, and the overflow grooves 7 is configured to discharge an excessive amount of staining liquid or cleaning liquid on the surface of the staining platform 1.

In order to further optimize the aforementioned technical solution, it is preferred on the basis of the aforementioned embodiment that in the aforementioned sample staining device, the overflow groove is disposed parallel to the edges of the supporting structure 3 and located at a position where the staining area 11 and the cleaning area 12 meet the supporting structure 3.

In the technical solution according to the present embodiment, the overflow groove is provided in an inner side of the supporting structure adjacent to the staining platform and configured to discharge the excessive amount of staining liquid or cleaning liquid to maintain the working liquid inside the staining platform at a stable level and prevent the liquid from overflowing. In addition, the staining or cleaning effect can be ensured by providing the liquid supplying groove in combination with the overflow groove to continuously supplement and discharge the working liquid. On the basis that the liquid supplying groove and the working liquid supplement groove are provided, it is possible to communicate them with the overflow groove, or to separate them from the overflow groove without influencing the supply of the liquid. The overflow groove may be located at both inner sides of the supporting structure, or may be located at one of the inner sides of the supporting structure, and a difference between them lies only in the extent of the discharge effect.

In order to further optimize the aforementioned technical solution, it is preferred on the basis of the aforementioned embodiment that in the aforementioned sample staining device, a main control module and a slide detector 10 coupled to the main control module are provided. The main control module detects whether there is a slide in a working area of the staining platform 1 through the slide detector 10, and controls a conveying action of the slide driving mechanism 2 and a supply of the staining liquid and the cleaning liquid accordingly.

It should be noted that the detector provided in the present embodiment is configure to detect a position of the slide, determine whether the slide enters a detection area corresponding to the detector and feedback a detection result to the main control module, and the main control module controls the output of the staining liquid or the cleaning liquid accordingly. It can be ensured that the liquid is supplied to the staining platform only when necessary, so as to save the liquid and reduce the staining examination cost. In addition, since the main control module is also in control connection with the slide driving mechanism which drives the translational movement of the slide, more precise control of staining of the sample can be achieved. Specifically, for example, when a slide to be stained is detected to enter a certain working area, the slide driving mechanism may change the conveying speed or discontinue the conveyance, so that the sample on the slide can be infiltrated in the environment of the staining liquid or the cleaning liquid for a certain period, and various requirements of staining experiments can be met. In addition, by mean s of the main control module controlling the slide to pass through different working areas, and it is possible to specifically control the period for the slide to stay and pass through each functional area according to various experiment objects, staining liquids and ambient temperatures, so as to achieve an optimal staining effect.

In order to further optimize the aforementioned technical solution, it is preferred on the basis of the aforementioned embodiment that in the aforementioned sample staining device, the staining platform 1 is provided with a heating assembly in a predetermined area thereon, and the heating assembly is configured to heat the slide 1 or the working liquid. The heating assembly is communicatively coupled to the main control module.

For certain special agents that need to perform staining under heating conditions, the present embodiment also provides a pre-heating design, i.e., the heating assembly is provided in the predetermined area on the staining platform. According to specific experiment requirements, the heating assembly may be placed in front of the staining area to perform pre-treatment, or directly placed in the staining area to enhance staining via a high temperature, or placed in the cleaning area to meet some requirements of cleaning for special heating conditions. Take the Carbolfuchsin staining method for example, the staining experiment is carried out by using the device of the present disclosure, and the heating assembly is preferably provided in the staining area such that the slide is stained under a heating condition.

On the basis of the technical solutions provided by the aforementioned embodiments, it should be noted that the staining platform provided by the present disclosure may include not only the aforementioned staining area and cleaning area, but also include a plurality of staining areas designed according to different staining methods utilizing various staining liquids and procedures in practical applications to achieve a compound staining or a diversified staining. For example, according to some specific requirements of the staining experiments, a buffering area may be provided between the staining area and the cleaning area, and a buffering liquid and the staining liquid together act on the slide, e.g., the buffering area is suitable for a staining experiment in the Wright's staining method. In addition, a decoloring area may be provided after the staining area, e.g., for the Gram staining method, the decoloring area is preferably provided after the sample is stained by the ammonium oxalate crystal violet and the iodine solution, and performs discoloration to the sample by supplying alcohol. In addition, the staining area and the cleaning area may be arranged in a straight line, or the staining area and the cleaning area may be arranged in parallel. A second slide driving mechanism may be provided when the staining area and the cleaning area are arranged in parallel so as to convey the slide to the staining area and the cleaning area arranged in parallel. It should be noted that the basic structure of the aforementioned buffering area or the aforementioned decoloring area is basically the same as that of the staining area or the cleaning area in the present disclosure, except that the provided function and liquid are different.

Figure 3:
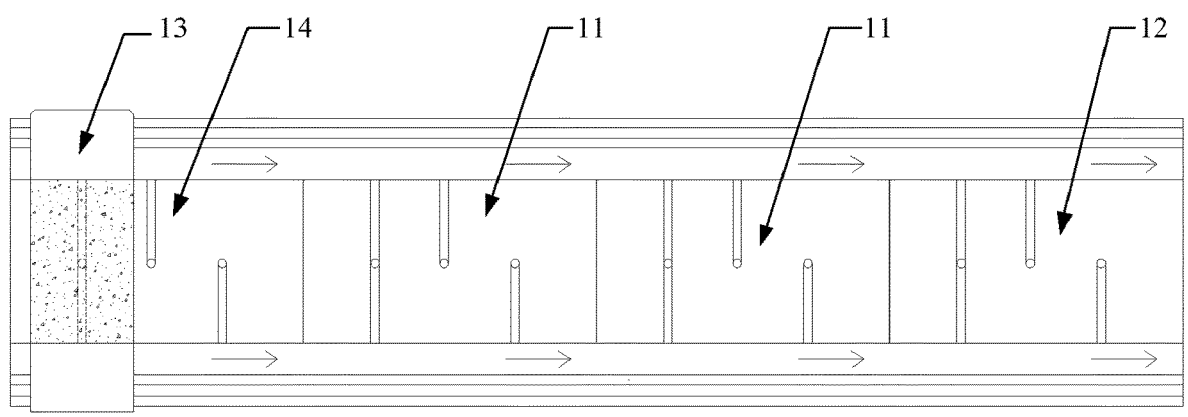
FIG. 3 is a schematic a top plan view of a sample staining device according to a further embodiment of the present disclosure.

Referring to FIG. 3, FIG. 3 is a schematic a top plan view of a sample staining device according to a further embodiment of the present disclosure.

In addition, a fixing area 14 is located in front of the staining platform, in which the slide can be simply fixed before the entire staining process is started, so that the subsequent staining can be proceeded smoothly.

In the specification herein, the various embodiments are described in a progressive manner, and each embodiment focuses on the difference from the other embodiments, and the same or similar parts between the various embodiments may be referred to each other.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the present disclosure. Accordingly, the present disclosure will not be limited to the embodiments shown herein, but will conform to the broadest scope consistent with the principles and novel features disclosed herein.

What is claimed is:

1. A sample staining device, comprising:
 a staining platform provided with a staining liquid supplying portion and a cleaning liquid supplying portion, the staining platform is provided with a liquid supplying groove on a surface thereof, the liquid supplying groove is provided with a liquid outlet configured to supply a working liquid to the staining platform;
 a supporting structure located on both sides of the staining platform and configured to form a gap between a slide and a surface of the staining platform;
 a slide driving mechanism configured to maintain a clearance movement of the slide with respect to the staining platform; and
 a working liquid supplement groove in communication with a liquid outlet provided in front of the liquid supplying groove along the passing direction of the slide, wherein the working liquid supplement groove extends from an edge of the supporting structure and ends at a center line of the staining platform that extends along the passing direction of the slide, both the liquid outlet of the liquid supplying groove and the liquid outlet of the working liquid supplement groove are located at the center line of the staining platform that extends along the passing direction of the slide;
 wherein the staining platform is provided with an overflow groove on a periphery thereof, and the overflow groove is configured to discharge an excessive amount of the staining liquid or the cleaning liquid and wherein the overflow groove is disposed parallel to a length direction of the staining platform.

2. The sample staining device according to claim 1, wherein the staining platform has a staining area and a cleaning area along a passing direction of the slide, and the staining area and the cleaning area are provided with independent working liquid output structures, respectively.

3. The sample staining device according to claim 2, wherein each of the working liquid output structures comprises a liquid outlet located on the surface of the staining platform and configured to supply a working liquid to the staining platform.

4. The sample staining device according to claim 1, wherein both ends of the liquid supplying groove extend to both edges of the staining platform.

5. The sample staining device according to claim 1, wherein the working liquid supplement groove located in the staining area is configured to output a staining liquid to the staining area, and the working liquid supplement groove located in the cleaning area is configured to output a cleaning liquid to the cleaning area to wash a residual staining liquid.

6. The sample staining device according to claim 1, further comprising a main control module configured to control an operation of the slide driving mechanism and an output of the staining liquid and the cleaning liquid.

7. The sample staining device according to claim 6, further comprising a detector configured to detect whether the slide reaches a corresponding working area, the detector being communicatively coupled to the main control module.

8. The sample staining device according to claim 6, wherein the staining platform is provided with a heating assembly in a predetermined area thereon, and the heating assembly is configured to heat the slide or a working liquid.

9. The sample staining device according to claim 1, wherein the slide driving mechanism is a threaded spindle mechanism.

* * * * *